US010399400B2

(12) United States Patent
Hartshorn et al.

(10) Patent No.: US 10,399,400 B2
(45) Date of Patent: Sep. 3, 2019

(54) EXTENDED DURATION AUTONOMOUS CRAFT

(71) Applicant: The Boeing Company, Chicago, IL (US)

(72) Inventors: Scott Hartshorn, Snohomish, WA (US); Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 15/667,497

(22) Filed: Aug. 2, 2017

(65) Prior Publication Data

US 2019/0039427 A1 Feb. 7, 2019

(51) Int. Cl.

| | |
|---|---|
| *B60F 5/02* | (2006.01) |
| *B63G 8/00* | (2006.01) |
| *B63G 8/08* | (2006.01) |
| *B63G 8/22* | (2006.01) |
| *B64B 1/58* | (2006.01) |
| *C25B 1/00* | (2006.01) |
| *C25B 1/04* | (2006.01) |
| *G05D 1/04* | (2006.01) |
| *B63B 35/00* | (2006.01) |
| *B64C 39/02* | (2006.01) |
| *C25B 15/02* | (2006.01) |
| *H01M 10/46* | (2006.01) |
| *H02S 10/40* | (2014.01) |
| *H02S 40/38* | (2014.01) |

(52) U.S. Cl.
CPC ............... *B60F 5/02* (2013.01); *B63B 35/00* (2013.01); *B63G 8/001* (2013.01); *B63G 8/08* (2013.01); *B63G 8/22* (2013.01); *B64B 1/58* (2013.01); *B64C 39/024* (2013.01); *C25B 1/003* (2013.01); *C25B 1/04* (2013.01); *C25B 15/02* (2013.01); *G05D 1/042* (2013.01); *H01M 10/465* (2013.01); *H02S 10/40* (2014.12); *H02S 40/38* (2014.12); *B63B 2035/007* (2013.01); *B63G 2008/004* (2013.01); *B64C 2201/022* (2013.01); *B64C 2201/101* (2013.01); *B64C 2201/141* (2013.01); *B64D 2211/00* (2013.01); *H01M 2220/20* (2013.01)

(58) Field of Classification Search
CPC ............ B60F 5/02; H02S 10/40; C25B 15/02; G05D 1/042; B64B 1/58; B64C 39/024; B64C 2201/022; B63B 35/00
See application file for complete search history.

(56) References Cited

U.S. PATENT DOCUMENTS 2,721,716 A 10/1955 Beadle
3,791,667 A 2/1974 Haviland
(Continued)

OTHER PUBLICATIONS

Whitmore, Stephen A., et al., Design of a Passively Reefed, Collapsible Drogue Parachute System, Journal of Aircraft vol. 44, No. 6, Nov.-Dec. 2007, 12 pages.
(Continued)

*Primary Examiner* — Michael D Lang
(74) *Attorney, Agent, or Firm* — Kolisch Hartwell, P.C.

(57) ABSTRACT

Autonomous craft capable of extended duration operations as lighter-than-air craft, having the ability to alight on the surface of a body of water and generate hydrogen gas for lift via electrolysis using power derived from a photovoltaic system, as well as methods of launching an unmanned aerial vehicle (UAV) having a deployable envelope from a surface of a body of water.

23 Claims, 6 Drawing Sheets

(56) References Cited

U.S. PATENT DOCUMENTS

| | | | |
|---|---|---|---|
| 4,726,888 | A | 2/1988 | McCambridge |
| 5,348,254 | A | 9/1994 | Nakada |
| 5,843,292 | A | 12/1998 | Spiros |
| 7,278,607 | B2 | 10/2007 | Fuller |
| 9,534,303 | B2 | 1/2017 | Kelly et al. |
| 2009/0206194 | A1 | 8/2009 | Sinsabaugh |
| 2011/0226174 | A1 | 9/2011 | Parks |
| 2018/0319477 | A1* | 11/2018 | Yakub ................ B64B 1/58 |

OTHER PUBLICATIONS

Bruton, Jared T., et al., Packing and deploying Soft Origami to and from cylindrical volumes with application to automotive airbags, Royal Society Open Science 3:160429, Aug. 25, 2016, 15 pages.

Florida Solar Energy Center, Hydrogen Basics—Solar Production, retrieved from the internet on May 17, 2017 at URL: http://www.fsec.ucf.edu/en/consumer/hydrogen/basics/production-solar.htm, 2 pages.

Office of Energy Efficiency & Renewable Energy, Hydrogen Production: Electrolysis, retrieved from the internet on May 17, 2017 at URL: https://energy.gov/eere/fuelcells/hydrogen-production-electrolysis, 4 pages.

Google Project Loon, What is Project Loon webpage, retrieved from the internet on Jun. 23, 2017 at URL: https://x.company/loon/, 2 pages.

Google Project Loon, Technology webpage, retrieved from the internet on Jun. 23, 2017 at URL: https://x.company/loon/technology/, 3 pages.

\* cited by examiner

EXTENDED DURATION AUTONOMOUS CRAFT

FIELD

This disclosure relates to autonomous craft capable of travel on water or in the air, and more specifically to autonomous craft capable of extended duration operation.

BACKGROUND

Unmanned vehicles, including Unmanned Aerial Vehicles (UAV or drones), Unmanned Surface Vehicles, and Unmanned Underwater Vehicles, have proven useful for a wide variety of commercial, scientific, and military applications. However, such vehicles are typically used for relatively short-duration missions, partly due to the constraints of carrying sufficient fuel for extended missions, and partly due to the need for remote piloting of the vehicle. Therefore, in order to enhance utility for very long duration applications, such vehicles should be substantially autonomous, and able to operate without requiring frequent refueling.

Some unmanned vehicles have been used as long-term platforms when moored in place, or even permitted to drift on the water's surface or in the atmosphere, the lack of directed mobility may critically limit the capabilities of such platforms.

What is needed is an autonomous vehicle capable of powered flight that is additionally able to refuel autonomously and in the absence of a fueling infrastructure.

SUMMARY

The present disclosure provides autonomous craft capable of extended duration operations as lighter-than-air craft by having the ability to float on the surface of a body of water and generate hydrogen gas for lift via electrolysis using power derived from a photovoltaic system. The disclosure further provides methods of launching an unmanned aerial vehicle (UAV) having a deployable envelope from a surface of a body of water.

In some aspects, the disclosure may provide an autonomous craft that includes a hull structure configurable to support the craft on the surface of a body of water; an inflatable envelope coupled to the hull structure that is capable of containing an amount of hydrogen gas sufficient to render the autonomous craft lighter-than-air; a storage battery configured to store electricity received from an electrical network and discharge electricity into the network; a photovoltaic system having one or more photovoltaic panels that is coupled to the electrical network and configured to generate electricity from light; an electrolysis apparatus coupled to and powered by the electrical network that can electrolyze ambient water and generate hydrogen gas when the craft is near to or on the surface of the body of water; a hydrogen gas handling system that can compress and store the generated hydrogen gas in a storage tank, release the compressed hydrogen gas into the inflatable envelope, and to compress and store hydrogen withdrawn from the inflatable envelope in the storage tank; and a processing system that can control the electrical network, the photovoltaic system, the storage battery, and the electrolysis apparatus. The processing system of the autonomous craft may be further configured to control the buoyancy of the autonomous craft by varying the amount of hydrogen in the envelope.

In some aspects, the disclosure may provide an autonomous craft that includes a vessel configured to alternately float upon a water surface and to float aloft as a lighter-then-air craft using a hydrogen gas supply for buoyancy, where the vessel includes a photovoltaic array for providing power and an electrolysis apparatus for electrolyzing water while floating on the water surface in order to replenish the hydrogen gas supply.

In some aspects, the disclosure may provide a method of launching a UAV having a deployable envelope from a surface of a body of water, the method including electrolyzing water from the body of water to generate hydrogen gas, adding the hydrogen gas to the deployable envelope to increase the buoyancy of the UAV, and lifting the UAV from the surface of the body of water.

The recited features, functions, and advantages of the disclosed devices and methods may be achieved independently in various aspects of the present disclosure, or may be combined in yet other aspects further details of which can be seen with reference to the following description and drawings.

BRIEF DESCRIPTION OF THE DRAWINGS

FIG. 4A shows the envelope anchored and deployed. FIG. 4B shows the envelope being deflated and reeled in. FIG. 4C shows the envelope fully stowed.

DESCRIPTION

Various examples of autonomous craft having one or more advantageous properties are described below and illustrated in the associated drawings. Unless otherwise specified, the disclosed autonomous craft and/or methods including the disclosed autonomous craft may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other autonomous craft or UAVs.

The following description of various such examples is merely exemplary in nature and is in no way intended to limit the disclosure, its application, or uses. Additionally, the advantages provided by the examples, as described below, are illustrative in nature and not all examples may provide the same advantages or the same degree of advantages.

Figure 1:
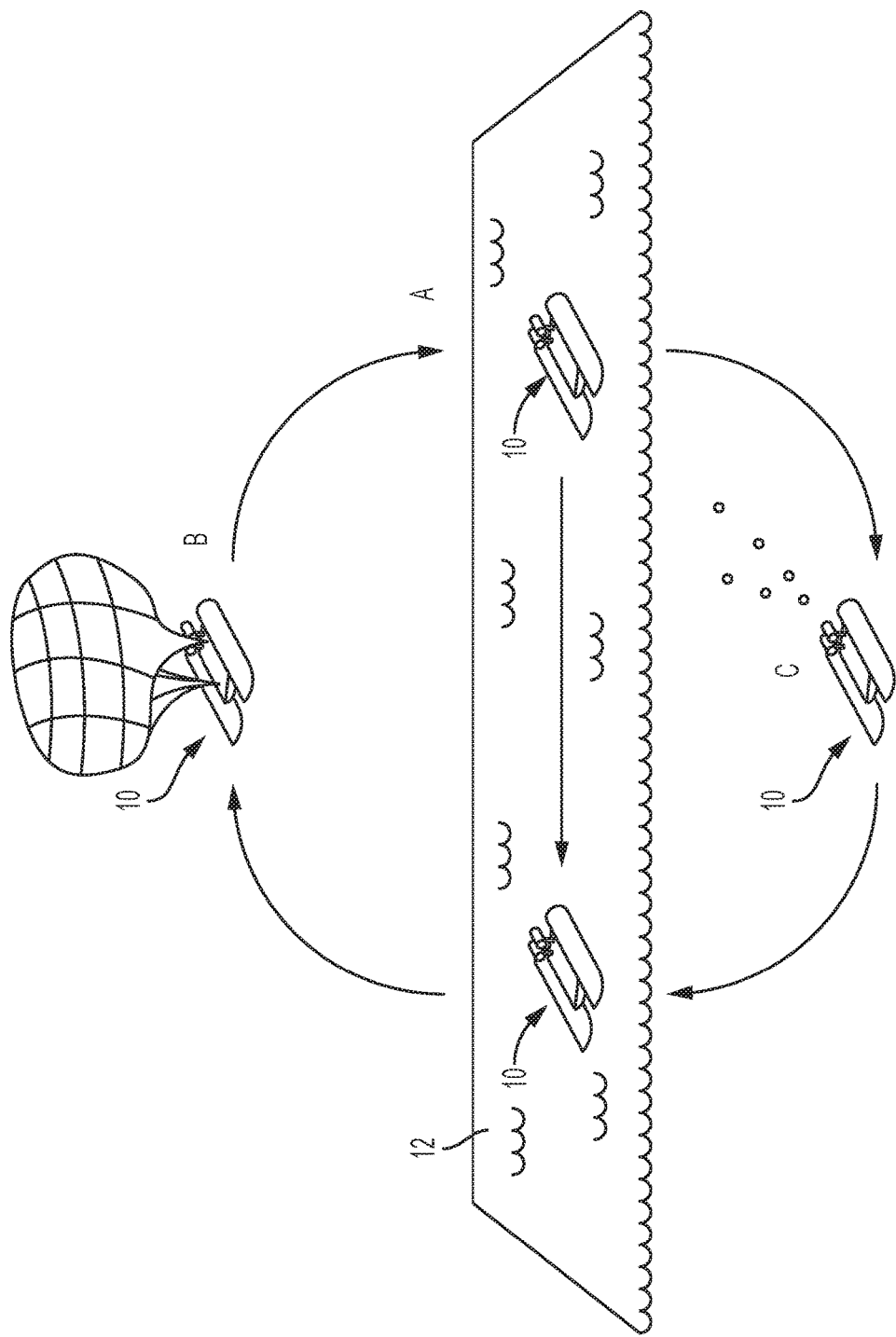
FIG. 1 is a depiction of an illustrative autonomous craft according to the present disclosure traveling on the surface of a body of water, above the surface of the body of water, and beneath the surface of the body of water.

FIG. 1 depicts an illustrative autonomous craft or vessel 10 according to the present disclosure that is configured to be capable of resting and/or traveling upon a surface of a body of water 12 as a surface craft (A), capable of floating aloft as a lighter-than-air craft (B), and additionally or alternatively capable of submerging and/or traveling as a submersible craft (C). Autonomous craft 10 may be configured to employ hydrogen gas to generate lift in order to travel aloft, and may therefore be capable of performing extended duration missions by descending to the surface 12 and replenishing its hydrogen gas supply through the electrolysis of collected water.

Figure 2:
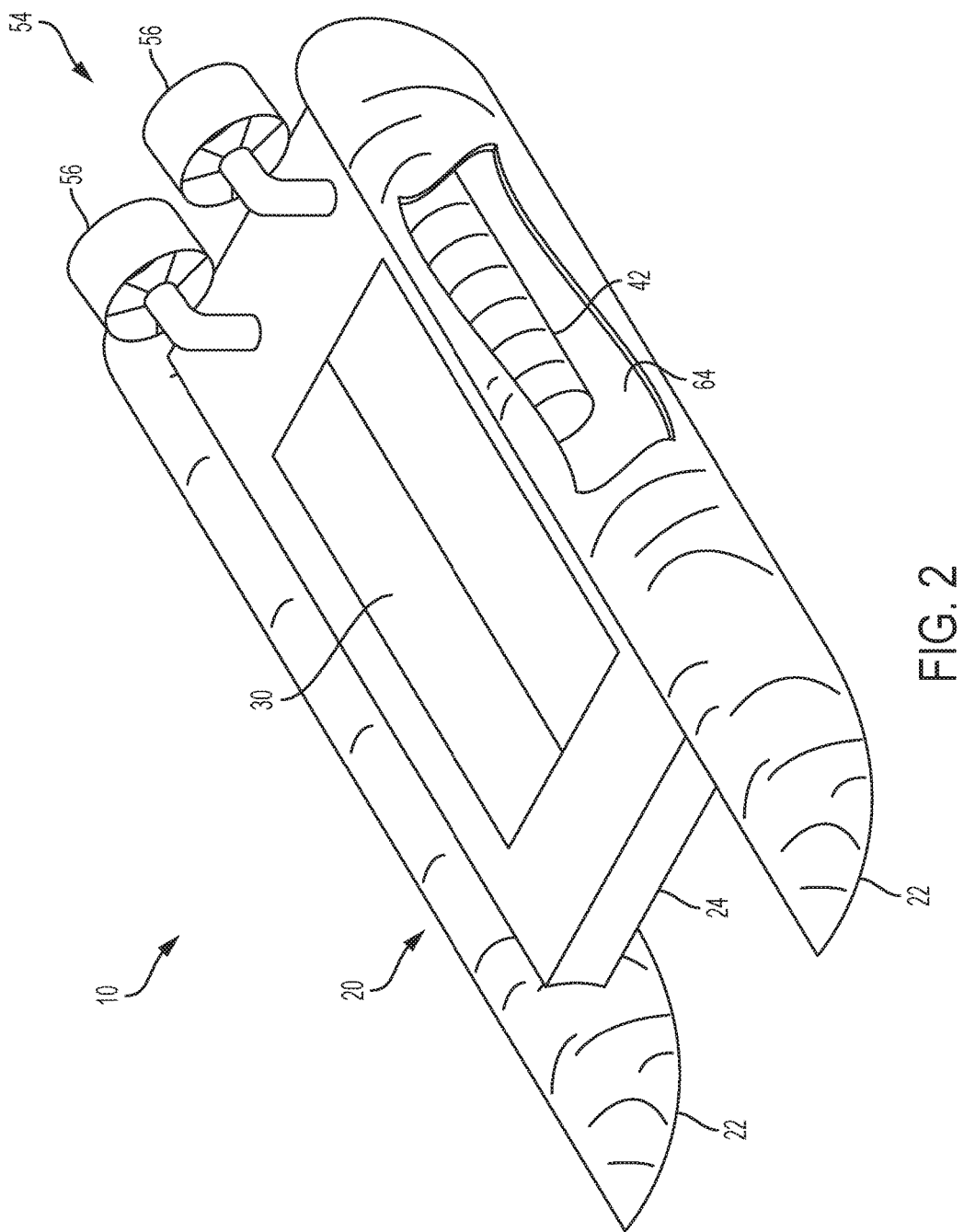
FIG. 2 is a depiction of an illustrative autonomous craft according to the present disclosure.

An exemplary and illustrative autonomous craft 10 is depicted in FIG. 2, and craft 10 may include one or more of a variety of components and systems in order to enable or facilitate the intended operation of the craft, as shown in FIGS. 2-7.

Craft 10 includes a hull structure 20 that is configured or configurable so that craft 10 can be supported on a surface of a body of water. As shown in FIG. 2, craft 10 includes two pontoon members 22 and a cabin structure 24 extending between pontoons 22. Although depicted as having two pontoon members 22, autonomous craft 10 may incorporate any suitable hull structure that facilitates floating or traveling on a water surface, including single hulls (such as flat-bottomed, v-bottomed, and rounded hulls), or multi-hulls (such as catamarans, trimarans, and the like). The hull structure 20 may incorporate both rigid and inflatable portions, such as for example used for ZODIAC inflatable boats (Zodiac Nautic), although a purely rigid hull design may offer greater durability.

Craft 10 may further include an inflatable envelope 26 that is securely coupled to the hull structure 20. Envelope 26 is configured so that it is capable of containing an amount or volume of hydrogen gas that is sufficient to render the autonomous craft 10 lighter-than-air. That is, craft 10 may be configured so that when envelope 26 is inflated with sufficient hydrogen gas to offset the weight of the craft, it may ascend vertically as a lighter-than-air craft, suspended from envelope 26 in a manner similar to the gondola of a balloon.

Figure 3:
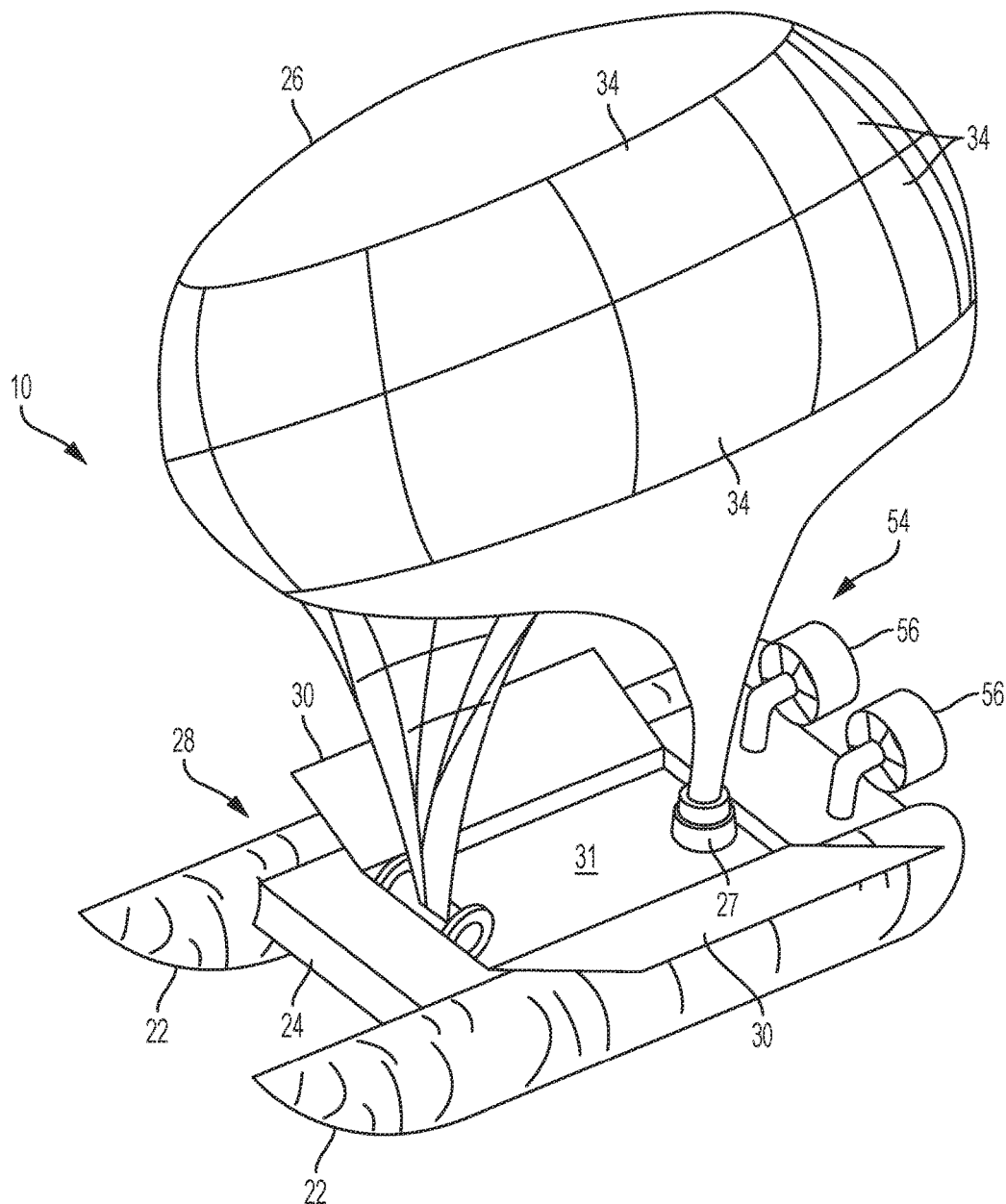
FIG. 3 depicts the illustrative autonomous craft of FIG. 2 having a deployed inflatable envelope.

Craft 10 is depicted suspended from envelope 26 in FIG. 3. When not in use, envelope 26 is stowed within cabin structure 24. When inflated, envelope 26 is coupled to craft 10 at envelope coupling 27, which includes the valves and plumbing for adding and removing hydrogen from the envelope, as well as supporting some of the weight of craft 10. Envelope 26 is also attached to craft 10 at the forward end of cabin structure 24 via a reel mechanism 28, which serves to help retract and stow envelope 26 when not inflated.

Figure 4A:
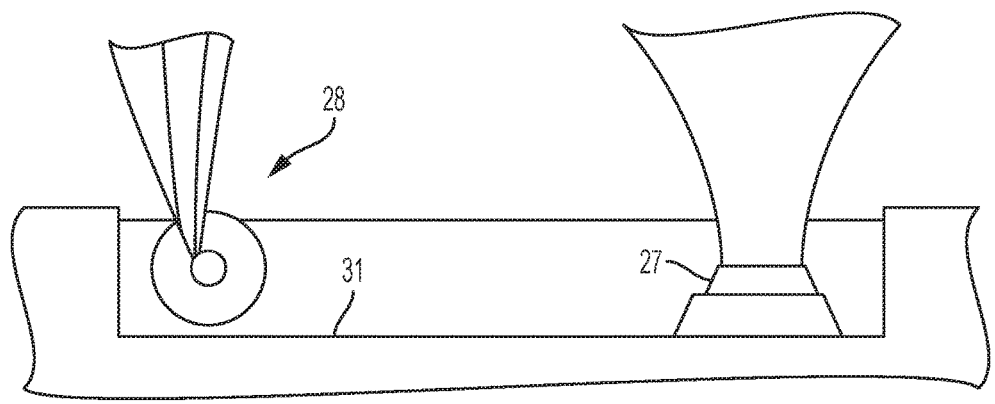
FIGS. 4A-4C schematically depict cross-sectional views of the envelope compartment of an autonomous craft as an inflatable envelope is retracted and stored.
Figure 4B:
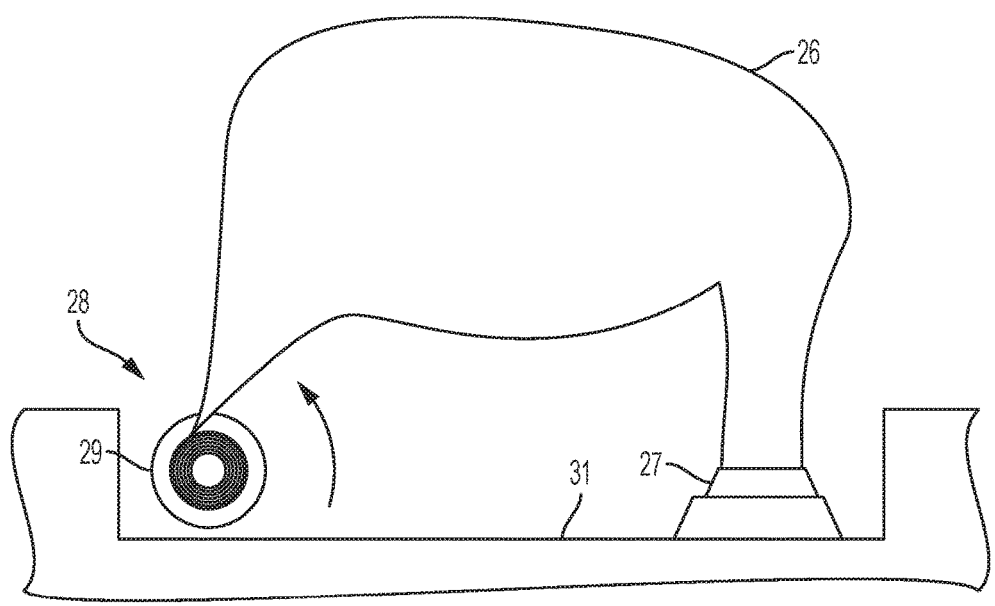
Figure 4C:
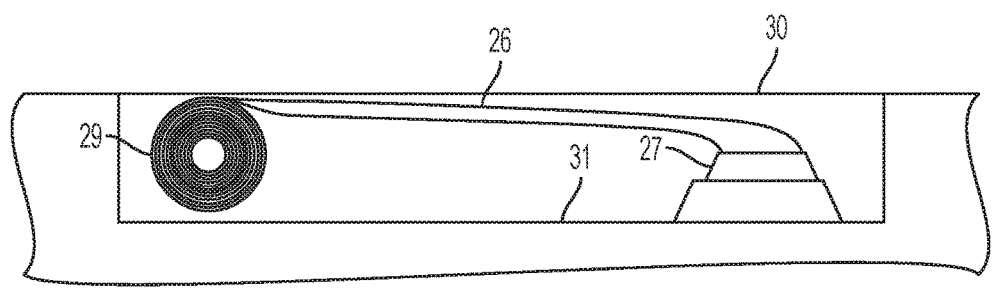

The portion of cabin structure 24 used to stow envelope 26 is shown in cross-section in FIGS. 4A-4C. In FIG. 4A envelope 26 is fully deployed. When it is desirable to deflate and stow envelope 26, hydrogen is removed from envelope 26 at the same time that reel mechanism 28 begins to turn, thereby rolling up envelope 26, as shown in FIG. 4B. Reel mechanism 28 may include conical endplates in order to help guide envelope 26 around reel 29 as the envelope deflates. At the same time, the doors 30 of the envelope compartment 31 may be opened at an angle that further guides the envelope into position for stowing as it deflates. As shown in FIG. 4C, once envelope 26 is fully deflated and reeled completely around reel 29, the envelope is stowed in the envelope compartment, and the doors 30 can be closed.

To deploy envelope 26, the envelope is inflated with hydrogen gas as reeling mechanism 28 is reversed, feeding envelope off the reel.

Alternatively, or in addition, envelope 26 can incorporate or feature so-called 'soft origami' features to enhance deployment and stowing of the envelope (see for example Bruton et al., *R. Soc. open sci.* 3: 160429 (2017)). Balloons suitable for long-duration and/or high-altitude applications have been developed previously, see for example Google's Project Loon.

It should be appreciated that coupling 27 and reel mechanism 28 are constructed sufficiently robustly that the full weight of craft 10 may be suspended from envelope 26 when aloft.

Figure 5:
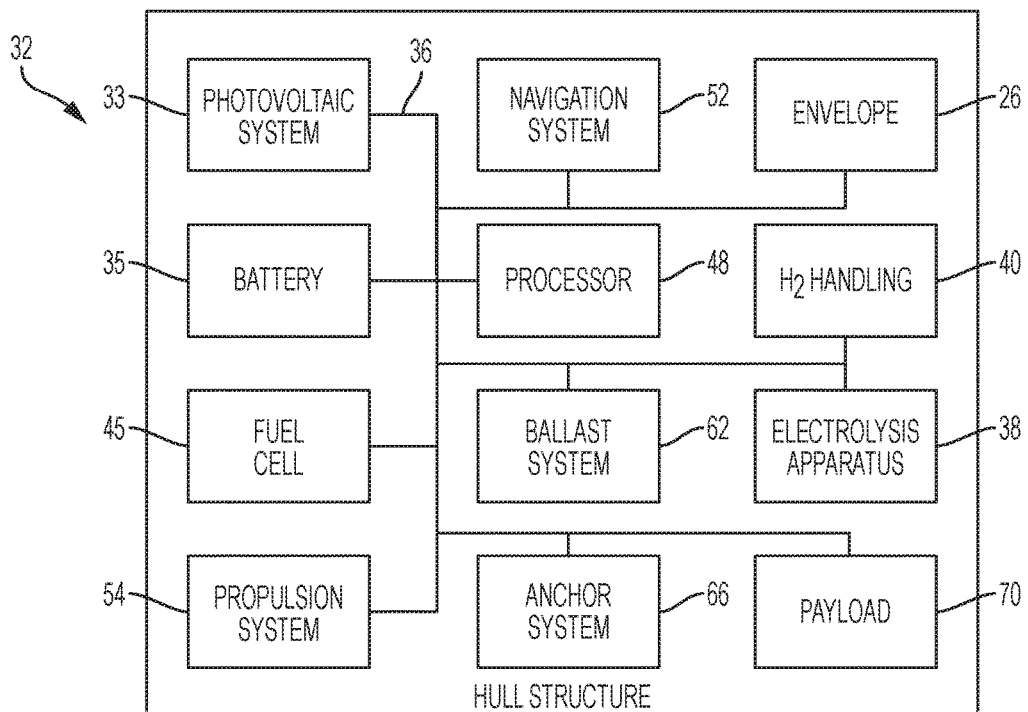
FIG. 5 schematically depicts the power generations and distribution system of the autonomous craft of the present disclosure.
Figure 6:
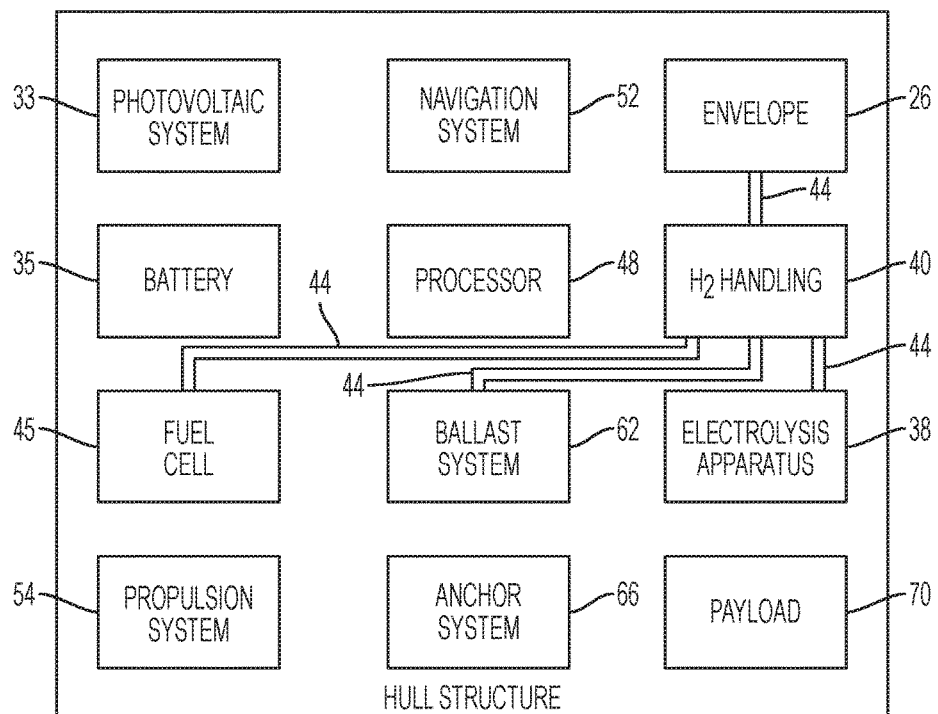
FIG. 6 schematically depicts the hydrogen generation and handling system of the autonomous craft of the present disclosure.

Craft 10 may additionally include a power generation and distribution system 32, which is shown schematically in FIG. 5. Any method of power generation with sufficient capacity to meet the needs of craft 10 is a suitable method of power generation, provided that the power generation system is sufficiently compact and/or lightweight to facilitate the ability of craft 10 to travel aloft.

In one aspect of the disclosed craft, the power generation and distribution system includes a photovoltaic system 33 having one or more photovoltaic panels 34, that are configured to generate electricity from light that is incident upon the photovoltaic panels. The photovoltaic panels 34 may be disposed on any suitable exterior surface of craft 10, such as on the upper surface of cabin structure 24, or on the doors 30 of the envelope compartment 31. However, it may be particularly advantageous to place photovoltaic panels 34 on the exterior of envelope 26 as shown in FIG. 3, so that when envelope 26 is deployed during daylight hours, electricity may be generated.

The power generation and distribution system 32 may include a storage battery 35 that is electrically coupled to the photovoltaic system 33 and configured to receive and store electricity generated by photovoltaic system 33. Storage battery 35 may be further configured to discharge stored electricity in order to power various other systems of craft 10 via an electrical network 36 that couples the photovoltaic system 33 to storage battery 35, as well as coupling battery 35 to the one or more additional components of craft 10 that may require electricity, as shown in FIG. 5

Electricity supplied by power system 32 may be used to operate an electrolysis apparatus 38 which may be coupled to electrical network 36. Electrolysis apparatus 38 may be configured to electrolyze ambient water in order to generate hydrogen gas, for example, ambient water may be obtained from a body of water on which craft 10 may be floating. Electrolysis apparatus 38 may obtain ambient water via a probe or dip tube that is configured to be lowered into the body of water through which ambient water may be aspirated into electrolysis apparatus 38 as needed. Alternatively, or in addition, an ambient water port may be incorporated into one of pontoon members 22, so that when craft 10 is afloat the water port will be in contact with ambient water which may be pumped to the electrolysis apparatus.

Craft 10 may incorporate a hydrogen gas handling system 40 that is configured to compress and store the hydrogen gas generated by electrolysis apparatus 38. Hydrogen gas handling system 40 may include the compressors and pumps necessary to move and store compressed hydrogen gas in one or more hydrogen storage tanks 42. Additionally, hydrogen gas handling system 40 may be configured to remove hydrogen gas from storage tank 42 and controllably add it to envelope 26 in order to generate lift, and similarly, to remove hydrogen gas from envelope 26 and compress the hydrogen gas to store in storage tank 42, reducing the aerial buoyancy of craft 10. Hydrogen gas may be moved where needed via a hydrogen gas manifold 44, as shown schematically in FIG. 6. As shown in FIG. 2, a hydrogen tank 42 may be disposed within one or both pontoon members 22.

As craft 10 includes an onboard supply of hydrogen, the power generation and distribution system 32 may include an auxiliary source of power generation that is a hydrogen fuel cell 45 that is configured to generate electricity via an electrochemical reaction between hydrogen gas stored onboard and oxygen, where the oxygen may be captured by electrolysis apparatus 38 or removed from the atmosphere as needed. For thermodynamic reasons, it would be impractical to use hydrogen fuel cell 45 to power electrolysis apparatus 38. However, fuel cell 45 may be used to supplement the supply of electricity available to other components under high demand, at the cost of consuming some stored hydrogen gas.

Figure 7:
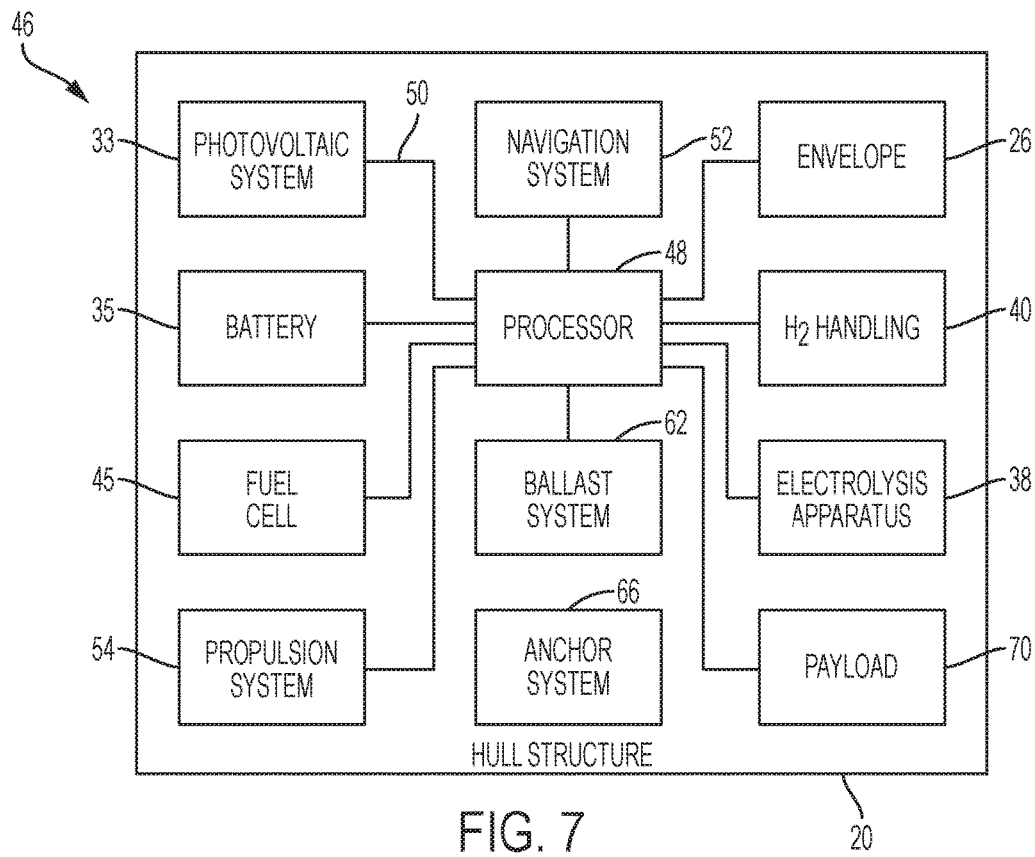
FIG. 7 schematically depicts the processing system of the autonomous craft of the present disclosure.

In order to perform in an autonomous fashion, craft 10 may include a processing system 46 that may include a processor 48 and a network 50 to relay data and/or commands to and from processor 48, as shown schematically in FIG. 7. Processing system 46 may be configured to control each of photovoltaic system 33, storage battery 35, electrolysis apparatus 38, and the hydrogen gas handling system 40. More particularly, processing system 46 may be configured to control the buoyancy of craft 10 by increasing or decreasing the amount of hydrogen contained within envelope 26.

Autonomous craft 10 may include a navigation system 52, where the navigation system may include one or more instruments configured to determine the absolute or relative position of craft 10 and provide that position to processor 48. For example, navigation system 52 may utilize one or more of inertial navigation, radio navigation, radar navigation, and satellite navigation (GPS), among others.

It should be appreciated that craft 10 may be useful as an unpowered platform, and rely upon wave action and tides (when on the water's surface) or prevailing winds (when aloft) for movement. Alternatively, in addition to navigation system 52, craft 10 may include a propulsion system 54. Any propulsion system capable of translating craft 10 in a desired direction is an appropriate propulsion system for the purposes of this disclosure. However, in order to facilitate operation in air, on the water's surface, and beneath the surface, it may be advantageous to employ propellers or screws for propulsion. In particular one or more pivoting ducted fans 56 may be used to direct craft 10 in the desired direction, with the rotation speed of the propeller varied depending on whether craft 10 is above or below the surface of the water. The propulsion system may be powered by the electrical network 36.

Processing system 46 may interpret the navigational data provided by navigation system 52, and then transmit command data to the propulsion system 54 in order to navigate craft 10 to a desired location, such as a body of water. The location of the body of water may be stored as part of map data by the processing system, or the body of water may be detected by a downwardly-directed optical sensor whose output may be analyzed by optical recognition software by processing system 46.

Figure 8:
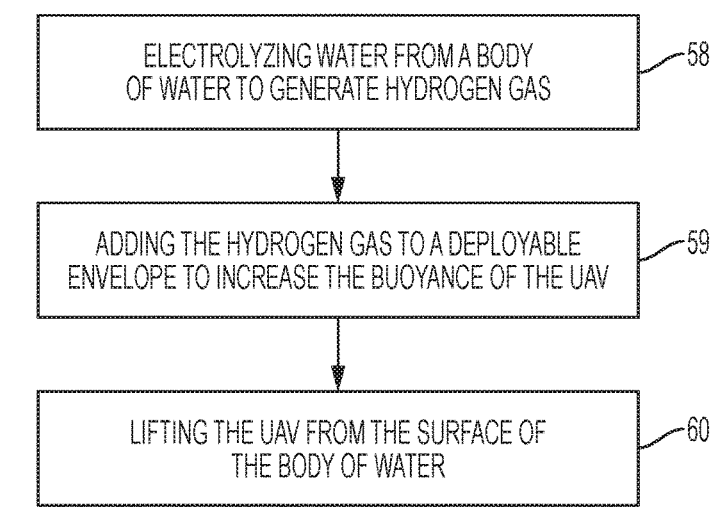
FIG. 8 is a flowchart depicting an illustrative method of launching an unmanned aerial vehicle according to the present disclosure.

By utilizing the processing system 46, navigation system 52, propulsion system 54, and the hydrogen gas handling system 40, craft 10 of the present disclosure may be configured to autonomously launch from the surface of a body of water as a lighter-than-air craft, as set out in flowchart 57 of FIG. 8, by first electrolyzing water from the body of water to generate hydrogen gas (at 58 of flowchart 57), by adding the hydrogen gas to the deployable envelope 26 to increase the buoyancy of craft 10 (at 59 of flowchart 57), and by lifting craft 10 from the surface 12 of the body of water (at 60 of flowchart 57). Craft 10 may then subsequently descend to and be supported by the surface 12 of the same or different body of water as a surface craft, after deflation of envelope 26.

Autonomous craft 10 may be further configured to operate as an autonomous submersible craft. Where craft 10 is configured to be submersible, the craft may include a ballast system 62 that includes one or more ballast tanks or compartments 64. For example, as shown in FIG. 2, the empty interior spaces of pontoon members 22 may be configured to act as ballast compartments. Craft 10 could be rendered less buoyant by the processing system 46 opening ballast valves and flooding the ballast compartments 64 of craft 10, or by pumping water into the ballast compartments. Once submerged, craft 10 could utilize propulsion system 54 to proceed to a desired location or in a desired movement pattern. To surface, the ballast compartments 64 would be emptied, either by displacing the water with compressed air stored onboard, or even by compressed hydrogen gas already available in hydrogen tank 42. Once ballast compartments 64 were empty, the ballast valves could be shut, and craft 10 could resume surface travel, or envelope 26 could be inflated and craft 10 could be launched for aerial travel. Processing system 46 may be additionally configured to control the buoyancy of craft 10 in water by varying the amount of water present in ballast compartments 64.

In some aspects, autonomous craft 10 may further include a retractable anchor system 66. Anchor system 66 may be configured to deploy and retracted a suitable anchoring device under the control of processing system 46 and powered by electrical network 36. The anchoring device may be configured to function as a conventional anchor, such that it is deployed to the bottom of a body of water when autonomous craft 10 is resting upon its surface, in order to secure craft 10 in a desired position. Alternatively, or in addition, the anchoring device may be configured so that it could be used to maintain an absolute or relative position of craft 10 while it is aloft, on the surface of the body of water, or submerged. In particular, the anchoring device may be configured so that it can maintain a position for craft 10 in a manner that does not consume power.

For example, an appropriate anchoring device may be configured to retain craft 10 while it is aloft above the water's surface, without requiring the craft to alight upon the surface itself. The volume and density of the anchoring device may be selected so that at a particular buoyancy craft 10 can remain aloft while the anchoring device is submerged, but is nevertheless unable to lift the anchoring device from the water. The buoyancy of craft 10 may be readily adjusted by adding or withdrawing hydrogen from envelope 26 by processing system 46. In this aspect of the disclosure, electrolysis apparatus 38 may obtain ambient water while craft 10 is aloft via the previously discussed probe or dip tube, which may be lowered into the water in order to aspirate water into electrolysis apparatus 38 as needed. In this manner the supply of water for producing hydrogen gas might be replenished without fully deflating envelope 26, which may be particularly useful when some or all of the photovoltaic panels 34 are disposed on the envelope surface.

It should be appreciated that autonomous craft 10 may be configured to carry any of a wide variety of payloads 70. In one aspect, craft 10 may be used to transport relatively small or light packages when speed is not a critical factor. Payload 70 may include mail, for example, or small parcels. Alternatively or in addition, payload 70 may include one or more electronic instruments capable of recording data. Where craft 10 may be used for research purposes, payload 70 may include weather instruments, radar equipment, sonar equipment, and tracking and/or locator equipment for radio tags among others. Payload 70 may include any of a variety of sensors, from visible light sensors (cameras) to night vision cameras, infrared cameras, and other electromagnetic sensors. Where the content of payload 70 requires power to function, payload 70 may be coupled to electrical network 36. Similarly, where payload 70 may require one or more aspects of control, payload 70 may be coupled to processing system 46.

EXAMPLES AND ALTERNATIVES

The following examples describe selected aspects of exemplary autonomous craft. These examples are intended for illustration and should not be interpreted as limiting the entire scope of the present disclosure. Each example may include one or more distinct disclosures, and/or contextual or related information, function, and/or structure.

Example 1

Hydrogen Replenishment

In one aspect of the present disclosure, the autonomous craft is provided with an initial supply of hydrogen gas sufficient to operate autonomously. Hydrogen is notoriously difficult to retain, as it can permeate most materials over time, therefore the craft should be able to maintain the onboard supply of hydrogen through replenishment on bodies of water.

Using current photovoltaic panel technologies, a photovoltaic panel 1 square meter in area could generate sufficient electricity during 8 hours of sunlight to generate approximately 36 grams of hydrogen. However, 36 grams of hydrogen could replenish up to 400 Liters of $H_2$ under standard conditions, which in turn would generate almost 470 grams of lift.

By increasing the photovoltaic panel array to 6 square meters, we would have a system capable of generating 2,400 Liters of hydrogen, or 2.8 kg of lift, after 8 hours of illumination. Where the hydrogen handling system and envelope of the disclosed craft loses less than 470 grams of lift per day per square meter of photovoltaic panel, the craft could in theory operate indefinitely Example 2

This section describes additional aspects and features of the autonomous craft of the present disclosure, and their use, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations. Each of the paragraphs including the term "substantially" may also be provided in the same form excepting that the term "substantially" is deleted.

A1. An autonomous craft, comprising:
a hull structure configurable to support the craft on a surface of a body of water;
an inflatable envelope coupled to the hull structure, the envelope capable of containing an amount of hydrogen gas sufficient to render the autonomous craft lighter-than-air;
a storage battery electrically coupled to an electrical network that is configured to store electricity from the network and discharge electricity into the network;
a photovoltaic system that is coupled to the electrical network, the photovoltaic system including one or more photovoltaic panels and configured to generate electricity from light on the photovoltaic panels;
an electrolysis apparatus coupled to and powered by the electrical network, configured to electrolyze ambient water to generate hydrogen gas when the craft is near to or supported on the surface of the body of water;
a hydrogen gas handling system, including a storage tank, where the gas handling system is configured to compress and store hydrogen gas generated by the electrolysis apparatus in the storage tank; to release compressed hydrogen gas from the storage tank into the inflatable envelope; and to compress and store hydrogen withdrawn from the inflatable envelope in the storage tank; and
a processing system configured to control the electrical network, the photovoltaic system, the storage battery, and the electrolysis apparatus; wherein the processing system is configured to control a buoyancy of the autonomous craft by varying an amount of hydrogen contained within the envelope.

A2. The autonomous craft of paragraph A1, wherein the processing system is configured to increase the buoyancy of the autonomous craft by increasing the amount of hydrogen gas contained within the envelope, and to decrease the buoyancy of the autonomous craft by withdrawing hydrogen gas from the envelope.

A3. The autonomous craft of paragraph A2, wherein the autonomous craft is further configured to autonomously leave the surface of the body of water as a lighter-than-air craft and subsequently return to and be supported by the same or different body of water as a surface craft.

A4. The autonomous craft of paragraph A3, wherein the autonomous craft is further configured to operate as a submersible craft.

A5. The autonomous craft of paragraph A4, further comprising a ballast system that includes a ballast compartment and a water pumping apparatus that is configured to fill the ballast compartment with ambient water to decrease the buoyancy of the craft, and to remove ambient water from the ballast compartment to increase the buoyancy of the craft; wherein the processing system is additionally configured to control the buoyancy of the craft by varying an amount of water contained in the ballast compartments.

A6. The autonomous craft of paragraph A4, further comprising a propulsion system that is configured to propel the craft while the craft is on the surface of the body of water, while the craft is operating as a lighter-then-air craft, or while the craft is submerged, or a combination thereof.

A7. The autonomous craft of paragraph A6, wherein the propulsion system includes one or more propellers.

A8. The autonomous craft of paragraph A6, wherein the propulsion system is coupled to and powered by the electrical network.

A9. The autonomous craft of paragraph A1, further comprising a hydrogen fuel cell as an auxiliary power source.

A10. The autonomous craft of paragraph A9, wherein the hydrogen fuel cell is coupled to the hydrogen gas handling system, and to the electrical network.

A11. The autonomous craft of paragraph A6, further comprising a navigation system coupled to the electrical network, wherein both the propulsion system and the navigation system are coupled to and controlled by the one or more processors, so that the autonomous craft is capable of autonomous navigation and movement.

A12. The autonomous craft of paragraph A11, wherein the autonomous craft is capable of autonomous navigation and movement when submerged, when afloat, and when aloft.

B1. An autonomous craft comprising:
a vessel configured to alternately float upon a water surface and to float aloft as a lighter-then-air craft using a hydrogen gas supply for buoyancy; the vessel including a photovoltaic array for providing power and an electrolysis apparatus for electrolyzing water while floating on the water surface to replenish the hydrogen gas supply.

B2. The autonomous craft of paragraph B1, that includes a reversibly deployable envelope that increases the buoyancy of the craft with the addition of hydrogen gas in order to float aloft.

B3. The autonomous craft of paragraph B1, wherein the vessel is further configured to submerge beneath the water surface.

B4. The autonomous craft of paragraph B3, that includes a ballast compartment that reduces the buoyancy of the craft when filled with water in order to submerge beneath the water surface.

B5. The autonomous craft of paragraph B1, that further includes a propulsion system capable of moving the autonomous craft while aloft, while on the water surface, or while submerged, or any combination thereof.

C1. A method of launching an unmanned aerial vehicle (UAV) having a deployable envelope from a surface of a body of water, comprising:
electrolyzing by the UAV water from the body of water to generate hydrogen gas;
adding the hydrogen gas to the deployable envelope to increase the buoyancy of the UAV; and
lifting the UAV from the surface of the body of water.

C2. The method of paragraph C1, further comprising storing at least some of the generated hydrogen gas aboard the UAV.

C3. The method of paragraph C1, further comprising:
exposing a photovoltaic array of the UAV to incident sunlight to generate electricity; and storing the generated electricity in a battery aboard the UAV.

C4. The method of paragraph C3, wherein the photovoltaic array is exposed to incident sunlight while the UAV is aloft.

C5. The method of paragraph C1, further comprising:
removing hydrogen gas from the envelope to reduce buoyancy;
descending to the surface of the body of water; and
alighting upon the surface of the body of water.

C6. The method of paragraph C5, further comprising stowing the envelope after the UAV alights upon the surface the surface of the body of water.

C7. The method of paragraph C1, where the UAV is initially submerged beneath the surface of the body of water, further comprising increasing the buoyancy of the UAV by removing water from a ballast compartment; and rising to the surface of the body of water before electrolyzing water to generate hydrogen gas.

C8. The method of paragraph C1, further comprising propelling the autonomous craft to a preselected destination using a navigation system and a propulsion system of the UAV.

Advantages, Features, Benefits

The different examples of autonomous craft described herein provide several advantages over previous drones and unmanned vehicles.

By operating as a lighter-than-air platform, the disclosed craft can offer an enhanced observation range, as well as an expanded communication range, particularly for modes of communication requiring line-of-sight.

The disclosed craft may inherently display stealthy characteristics. Detection can be minimized by rising to higher elevations, and even when on the surface the use of electric motors would still be very quiet. Where additional stealth may be required, the craft can submerge and move underwater.

Although stealthy operational characteristics may be advantageous for military applications, particularly reconnaissance, the same qualities are highly beneficial for some types of scientific research, particularly wildlife monitoring. A variety of research applications may be envisioned, including underwater surveys, sea floor mapping, and tracking individual animals or social units during migration.

The disclosed autonomous craft also offer the ability to deliver materials, such as small parcels, over long distances where speed is not a primary factor. For example, delivery of mail or medical supplies in rural areas of Africa, on isolated islands, and in generally undeveloped areas.

Conclusion

The disclosure set forth above may encompass multiple distinct disclosures with independent utility. Although each of these disclosures has been disclosed in its preferred form(s), the specific examples thereof as disclosed and illustrated herein are not to be considered in a limiting sense, because numerous variations are possible. The subject matter of the disclosures includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different disclosure or to the same disclosure, and whether broader, narrower, equal, or different in scope to the original claims, also are regarded as included within the subject matter of the present disclosure.

What is claimed is:

1. An autonomous craft, comprising:
a hull structure configurable to support the craft on a surface of a body of water;
an inflatable envelope coupled to the hull structure, the envelope capable of containing an amount of hydrogen gas sufficient to render the autonomous craft lighter-than-air;
a storage battery electrically coupled to an electrical network that is configured to store electricity from the network and discharge electricity into the network;
a photovoltaic system that is coupled to the electrical network, the photovoltaic system including one or more photovoltaic panels and configured to generate electricity from light on the photovoltaic panels;

an electrolysis apparatus coupled to and powered by the electrical network, configured to electrolyze ambient water to generate hydrogen gas when the craft is near to or supported on the surface of the body of water;

a hydrogen gas handling system, including a storage tank, where the gas handling system is configured to compress and store hydrogen gas generated by the electrolysis apparatus in the storage tank; to release compressed hydrogen gas from the storage tank into the inflatable envelope; and to compress and store hydrogen withdrawn from the inflatable envelope in the storage tank; and a processing system configured to control the electrical network, the photovoltaic system, the storage battery, and the electrolysis apparatus; wherein the processing system is configured to control a buoyancy of the autonomous craft by varying an amount of hydrogen contained within the envelope.

2. The autonomous craft of claim 1, wherein the processing system is configured to increase the buoyancy of the autonomous craft by increasing the amount of hydrogen gas contained within the envelope, and to decrease the buoyancy of the autonomous craft by withdrawing hydrogen gas from the envelope.

3. The autonomous craft of claim 2, wherein the autonomous craft is further configured to autonomously leave the surface of the body of water as a lighter-than-air craft and subsequently return to and be supported by the same or different body of water as a surface craft.

4. The autonomous craft of claim 3, wherein the autonomous craft is further configured to operate as a submersible craft.

5. The autonomous craft of claim 4, further comprising a ballast system that includes a ballast compartment and a water pumping apparatus that is configured to fill the ballast compartment with ambient water to decrease the buoyancy of the craft, and to remove ambient water from the ballast compartment to increase the buoyancy of the craft; wherein the processing system is additionally configured to control the buoyancy of the craft by varying an amount of water contained in the ballast compartments.

6. The autonomous craft of claim 4, further comprising a propulsion system that is configured to propel the craft while the craft is on the surface of the body of water, while the craft is operating as a lighter-than-air craft, or while the craft is submerged, or a combination thereof.

7. The autonomous craft of claim 6, wherein the propulsion system includes one or more propellers.

8. The autonomous craft of claim 6, wherein the propulsion system is coupled to and powered by the electrical network.

9. The autonomous craft of claim 6, further comprising a navigation system coupled to the electrical network, wherein both the propulsion system and the navigation system are coupled to and controlled by the processing system, so that the autonomous craft is capable of autonomous navigation and movement.

10. The autonomous craft of claim 9, wherein the autonomous craft is capable of autonomous navigation and movement when submerged, when afloat, and when aloft.

11. An autonomous craft comprising:

a vessel configured to alternately float upon a water surface and to float aloft as a lighter-than-air craft using a hydrogen gas supply for buoyancy; the vessel including a photovoltaic array for providing power and an electrolysis apparatus for electrolyzing water while floating on the water surface to replenish the hydrogen gas supply.

12. The autonomous craft of claim 11, including a reversibly deployable envelope that increases the buoyancy of the craft with the addition of hydrogen gas in order to float aloft.

13. The autonomous craft of claim 11, wherein the vessel is further configured to submerge beneath the water surface.

14. The autonomous craft of claim 13, including a ballast compartment that reduces the buoyancy of the craft when filled with water in order to submerge beneath the water surface.

15. The autonomous craft of claim 11, further including a propulsion system capable of moving the autonomous craft while aloft, while on the water surface, or while submerged, or any combination thereof.

16. A method of launching an unmanned aerial vehicle (UAV) having a deployable envelope from a surface of a body of water, comprising:

electrolyzing by the UAV water from the body of water to generate hydrogen gas;

adding the hydrogen gas to the deployable envelope to increase the buoyancy of the UAV; and lifting the UAV from the surface of the body of water.

17. The method of claim 16, further comprising storing at least some of the generated hydrogen gas aboard the UAV.

18. The method of claim 16, further comprising:

exposing a photovoltaic array of the UAV to incident sunlight to generate electricity; and storing the generated electricity in a battery aboard the UAV.

19. The method of claim 18, wherein the photovoltaic array is exposed to incident sunlight while the UAV is aloft.

20. The method of claim 16, further comprising:

removing hydrogen gas from the envelope to reduce buoyancy;

descending to the surface of the body of water; and alighting upon the surface of the body of water.

21. The method of claim 20, further comprising stowing the envelope after the UAV alights upon the surface of the body of water.

22. The method of claim 16, where the UAV is initially submerged beneath the surface of the body of water, further comprising increasing the buoyancy of the UAV by removing water from a ballast compartment; and rising to the surface of the body of water before electrolyzing water to generate hydrogen gas.

23. The method of claim 16, further comprising propelling the UAV to a preselected destination using a navigation system and a propulsion system of the UAV.

* * * * *